April 6, 1965   J. A. SEIDL   3,176,786
REINFORCED VEHICLE FRAME FOR LOW GROUND CLEARANCE VEHICLE
Filed Nov. 13, 1962
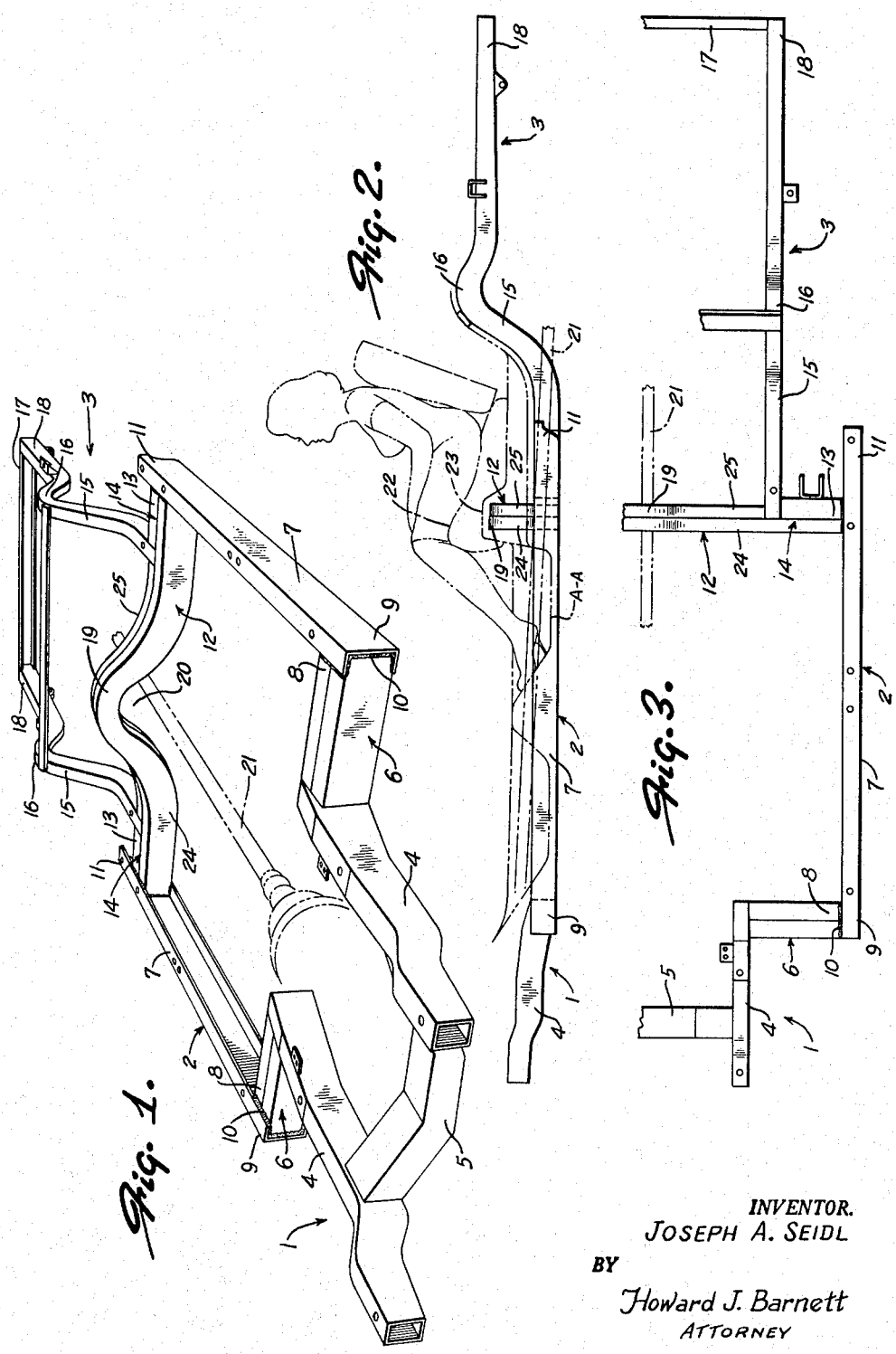
INVENTOR.
JOSEPH A. SEIDL
BY
Howard J. Barnett
ATTORNEY 3,176,786
REINFORCED VEHICLE FRAME FOR LOW
GROUND CLEARANCE VEHICLE
Joseph A. Seidl, Caledonia, Wis., assignor to A. O. Smith
Corporation, Milwaukee, Wis., a corporation of New
York
Filed Nov. 13, 1962, Ser. No. 236,980
2 Claims. (Cl. 180—70)

This invention is directed to a wide-hipped vehicle frame which includes a rear hip cross bar to provide lateral reinforcement to the rear middle portion of the vehicle, and more particularly to a frame in which the rear hip cross bar rises into the passenger compartment of the vehicle in the portion under the front of the rear seat to make room for the drive shaft.

The hip portions of a wide-hipped vehicle frame are adjacent to the vehicle wheels, and therefore are subject to the greatest torsional stresses when the vehicle is in use, especially when fully loaded with passengers or goods.

In addition, the floor of the passenger compartment beneath the rear seat of the vehicle is designed flush with the top of the frame to provide maximum cushion depth for the passenger seat while providing space for the vehicle drive shaft.

A rear hip cross bar of conventional design could not be employed to reinforce the rear hip portion of the vehicle because the drive shaft must be disposed through the space which would be required for the cross bar.

This invention provides a wide-hipped frame with ample lateral strength in the rear hip region while simultaneously providing a central arch midway of the reinforcing cross member to provide adequate clearance for the vehicle drive shaft.

The accompanying drawings illustrate the best mode presently contemplated for carrying out the invention.

In the drawings:

FIGURE 1 is a perspective view of the wide-hipped frame of the invention and showing a portion of the drive shaft of the vehicle;

FIG. 2 is a side elevational view of the frame shown in FIGURE 1 showing the relationship of the cross bar to the rear passenger seat which is shown in phantom;

FIG. 3 is a top plan view of one-half of the frame shown in FIGS. 1 and 2.

As shown in the drawings, the wide hipped frame of this invention comprises a narrow front section 1, a wide intermediate section 2, and a narrow rear section 3. The narrow front section 1 and rear section 3 provide clearance for the vehicle wheels (not shown). The wide intermediate section 2 provides support for the passenger compartment of the vehicle (not shown), and makes room for a depressed foot pan to provide greater chair height of seat cushions.

The front section 1 of the frame comprises a pair of laterally spaced front side rails 4 and an interconnecting cross member 5. The cross member 5 is disposed below the vehicle engine (not shown) and provides support for the engine and reinforcing means for the front section 1.

The front section 1 is interconnected with the intermediate section 2 by means of torque boxes 6 which extend laterally outwardly from the rear ends of the front side rails 4. The intermediate section 2 includes two laterally spaced, parallel middle side rails 7 which, in the embodiment shown, are channel members. Outer ends 8 of the torque boxes 6 nest inside the respective forward ends 9 of middle side rails 7, and are secured thereto by welds 10.

The rear ends 11 of the middle side rails 7 are interconnected and spaced apart by means of a transverse, rear hip cross bar 12. Immediately rearward of cross bar 12, and at each end thereof, are short, transverse members 13 which, together with the respective outer ends of cross bar 12, define rear torque boxes 14. The inner end of each transverse member 13 is secured to the forward end of its respective rear side rail 15.

The rear side rails 15 each include a kicked up portion 16 intermediate their length, and a rear cross member extends transversely between the rear side rails 15, connecting to each side rail 15 at the top of the respective kicked up portions 16. A rear end cross bar 17 connects rear ends 18 of the rear side rails 15 to complete the narrow rear section 3.

The rear hip cross bar 12 includes a central arch 19 midway of its length, defining a fore and aft passage 20 to provide clearance for the vehicle drive shaft 21 (shown in phantom in FIGS. 1 and 2).

The central arch 19 of the rear hip cross bar 12 is disposed substantially above the passenger floor level indicated by the line A—A in FIG. 2. In fact, the arch 19 extends up into the front portion of rear passenger seat 22 (shown in phantom), which includes a recess 23 to accommodate the central arch 19.

As shown in FIGURE 1, the rear hip cross bar 12 comprises a pair of complementary curved channel members 24 and 25, secured together to define a box section. It is also contemplated that the rear hip cross bar could take the form of a tubular member or a single channel member, the particular design expedients determining the choice.

The important feature of the rear hip cross bar 12 is the arch 19, providing the passage 20 for the drive shaft 21. The disposition of the arch in relation to the vehicle passenger seat 22 is also important, because passenger comfort would be impaired considerably if the arch were located anywhere but under the forward edge of the seat 22 (see FIG. 2).

As illustrated, the arch 19 fits under the knees of the passenger, which is the point of least passenger load on the seat. Therefore, a reinforcement of the rear hip portion of the frame is obtained by the arch 19 without the necessity of raising the floor level A—A of the vehicle, and without impairing passenger comfort.

Various modes of carrying out the invention are contemplated as being within the scope of the following claims particularly pointing out and distinctly claiming the subject matter which is regarded as the invention.

I claim:

1. A vehicle having a low silhouette, comprising a propulsion system having a drive shaft extending from the front portion thereof to the rear portion, a vehicle body having a contoured floor, a rear passenger seat having a central recess extending upwardly from under the bottom front portion thereof, a wide-hipped vehicle frame adapted to receive and support said vehicle body thereon, said frame being disposed in a horizontal plane coincident with the plane of said drive shaft, a transverse reinforcing member in the portion of said frame which is disposed beneath said rear passenger seat, said reinforcing member having an arched portion intermediate its ends extending upwardly into the central recess in the rear passenger seat to provide clearance for the drive shaft.

2. The vehicle of claim 1, in which the contoured floor includes a central recesesd portion extending upwardly into the recess in said rear passenger seat.

References Cited by the Examiner

UNITED STATES PATENTS

| | | | |
|---|---|---|---|
| 2,108,215 | 2/38 | Stief et al. | 296—28 |
| 2,126,607 | 8/38 | Boehner | 280—106 |
| 2,189,719 | 2/40 | Wallace | 280—106 |
| 2,335,546 | 11/43 | Sladky et al. | 280—106 |
| 2,856,226 | 10/58 | Purdy | 296—28 |
| 2,933,341 | 4/60 | Muller | 296—28 |
| 2,935,335 | 5/60 | Muller et al. | 280—106 |
| 2,997,313 | 8/61 | Wall | 296—28 X |

FOREIGN PATENTS

| | | |
|---|---|---|
| 664,915 | 1/52 | Great Britain. |
| 879,229 | 11/42 | France. |

A. HARRY LEVY, *Primary Examiner.*